United States Patent [19]
Angelle

[11] Patent Number: 5,846,440
[45] Date of Patent: *Dec. 8, 1998

[54] APPARATUS AND METHOD FOR HANDLING WASTE

[76] Inventor: Clinton J. Angelle, 1584 Grand Anse Hwy., Breaux Bridge, La. 70517

[ * ] Notice: The term of this patent shall not extend beyond the expiration date of Pat. No. 5,662,807.

[21] Appl. No.: 844,938

[22] Filed: Apr. 23, 1997

Related U.S. Application Data

[63] Continuation-in-part of Ser. No. 570,910, Dec. 12, 1995, Pat. No. 5,662,807.

[51] Int. Cl.$^6$ .................................................. B01D 21/18
[52] U.S. Cl. ........................... 210/803; 210/524; 210/527
[58] Field of Search ..................... 210/744, 803, 210/104, 112, 524, 527, 532.1

[56] References Cited

U.S. PATENT DOCUMENTS

| | | | |
|---|---|---|---|
| 1,879,135 | 9/1932 | Downes, et al. ........................ | 210/527 |
| 2,266,937 | 12/1941 | Tark ........................................ | 210/524 |
| 3,396,102 | 8/1968 | Forrest .................................... | 210/527 |
| 3,410,412 | 11/1968 | Fechter ................................... | 210/527 |
| 3,807,560 | 4/1974 | Pentz et al. .............................. | 210/83 |
| 3,822,788 | 7/1974 | Dunkers, et al. ....................... | 210/527 |
| 4,776,960 | 10/1988 | Cerroni ................................... | 210/527 |
| 5,490,920 | 2/1996 | Fruchtbaum, et al. ................. | 210/527 |

FOREIGN PATENT DOCUMENTS

| | | | |
|---|---|---|---|
| 2406858 | 8/1975 | Germany ................................ | 210/527 |
| 537309 | 6/1941 | United Kingdom .................... | 210/527 |

*Primary Examiner*—Christopher Upton
*Attorney, Agent, or Firm*—Domingue, Delaune & Waddell

[57] ABSTRACT

An apparatus for handling a waste material is disclosed. Generally, the apparatus comprises a container having disposed thereon a rail member. The apparatus also contains a trolley mounted on the rail. The trolley has operatively associated therewith a handling system that has a wiper that extends into the container. The apparatus may also contain an auger, operatively mounted on the container, adapted for removing the waste from the container. A process for handling a discharged waste slurry is also disclosed.

12 Claims, 8 Drawing Sheets

5,846,440

APPARATUS AND METHOD FOR HANDLING WASTE

BACKGROUND OF THE INVENTION

This application is a continuation-in-part of Application Ser. No. 08/570,910 filed on Dec. 12, 1995, U.S Pat. No. 5,662,807. This invention relates to an apparatus and method for handling waste. More particularly, but not by way of limitation, this invention relates to a system for handling a discharge of waste in a safe and environmentally protected fashion.

The discharge of waste, particularly from the drilling of an oil and gas well for ultimate production, presents many environmental problems. For instance, when a well bore is drilled into the earth, the well may extend for many thousands of feet. During the drilling process, the well bore will be filled with a drilling fluid. The drilling fluid is necessary for several reasons including pressure control, and lubrication of the drill string.

Thus, the drilling fluid is an essential component of the drilling process. The physical and chemical composition of the drilling fluid will vary. However, many times the fluid contains hazardous materials such as oil. Also, the drilling fluid will contain solids which comprise rock and shale cuttings. The volumes thus discharged, coupled with the weight of the cuttings, is very significant.

An important number of environmental regulations pertaining to the removal, handling and treatment of this fluid has been promulgated over the years. The transferring of the drilling fluid from on-site holding tanks (also known as pits) to vehicles capable of hauling the waste creates the significant possibility of spillage. Thus, the handling of the drilling fluid so that the drilling fluid is disposed properly is a major issue for companies. Many types of prior art systems have been attempted to cure this problem, all with limited success. The invention herein disclosed solves these problems by disclosing a system and method of handling environmental waste in a safe and economical process. It should be noted that the invention herein disclosed is also applicable to other industries wherein the handling of waste for transportation to and from sites is necessary.

SUMMARY OF THE INVENTION

An apparatus for handling a waste material is disclosed. Generally, the apparatus comprises a container having disposed thereon a rail member. The apparatus also contains a car mounted on the rail. The car will have extending therefrom a first wiper that extends into the container. The apparatus may also contain an auger means, operatively mounted on the container, for removing the waste from the container.

In one embodiment, the wiper (also referred to as a shovel) comprises an elongated member having a first end and a second end, with the second end being pivotally mounted to the car. The apparatus may further comprise an oscillating means for oscillating the wiper. Also included will be transporting means for transporting the car via the rail from one end of the container to the other.

Generally, the waste contained within said container consist of a slurry comprising: a fluid; solids suspended in the fluid; and solids. The waste may be a discharged drilling fluid from a well bore. It should be noted, however, that the invention herein disclosed is applicable to other types of waste which contains fluids, solids suspended in fluid, and solids. The apparatus may further comprise pump means, operatively associated with the wiper, for pumping the fluid and solids suspended in the fluid from the container.

In another embodiment, the shovel comprises a first blade member attached to the elongated member at the first end, and a second blade member also attached to the elongated member at the first end. In this embodiment, the first blade member is positioned in a first direction relative to the container and the second blade member is positioned in a second direction relative to the container. Thus, waste can be shifted to one end of the container by the first blade member; alternatively, movement in the opposite direction will shift the waste to the opposite end of the container by the second blade.

A process for handling a discharged waste slurry is also disclosed. In the preferred embodiment, the waste slurry is a drilling fluid discharged from a drilled bore hole. The process includes placing the discharged waste slurry into a container. In this embodiment, the container contains: a rail; a trolley positioned on the rail; a pump means for pumping the discharged waste slurry from the container; a shovel means, operatively associated with the trolley, for shoveling the discharged waste slurry from a first position within said container to a second position within the container.

The process further includes transporting the trolley from a first position to a second position. The pump means can pump the discharged waste slurry from the container. In one embodiment, the shovel means contains an elongated member capable of pivoting. The process further comprises pivoting the shovel means in a swinging fashion, and thereafter, stirring the discharged waste slurry. The pump means can withdraw the waste slurry from the container so that the container is emptied.

The process may further comprise the steps of terminating the pumping, and thereby allowing the waste to separate into a mostly fluid phase and a solid phase. Thereafter, the operator would adjust the physical level of the pump means so that the pump coincides with the level of the fluid phase. Next, the operator would pump the waste from the container.

The process may also include transporting the trolley from a first position to a second position on the rail. Thus, the shovel means would push the solids to the second position within the container. The container may further include an auger positioned at the second position. Therefore, the process further comprises the steps of removing the solids from the container with the aid of the auger.

A second embodiment of the present invention, which is the preferred embodiment of this application, is also disclosed. This second embodiment includes a system for handling waste material comprising a tank containing the waste material and a reciprocating carriage operatively associated with the tank. The reciprocating carriage will have a handling member adapted thereto, with a pump means, operatively associated with the handling member, for pumping the waste material from the tank. The system will also contain an auger, positioned within the tank, that is adapted to convey the waste material from the tank.

In one embodiment, the handling member has a first end pivotly attached to the reciprocating carriage, and the second end has disposed therewith a process device. A reciprocating means is operatively associated with the handling member so that the elongated member may be pivoted within the tank. Generally, the process device is a vertically oriented auger attached to the handling member. Also, the system may include a slurry gate operatively associated with the pump means and adapted to receive the waste material discharged from the process device. In the preferred embodiment, the process device contains a vertically oriented spiral blade.

Also disclosed is an impeller means, operatively associated with the pump means, for loading the pump means. The impeller means may comprise a series of rotor blades rotatably mounted beneath the pump. The rotor blades may contain a vertically oriented plate member, with the plate member having a concave surface formed therewith that aids in channeling the waste into the pump. Additionally, the process device may contain a plurality of teeth adapted to the spiral blade of the process device. The process device may be detachably constructed with the handling member for selective detachment.

The second embodiment also discloses a process for handling waste materials. Generally, the process comprises placing the waste material within a system. The system will comprise a tank containing the waste material; a reciprocating carriage having a handling member adapted thereto; a pump means for pumping the waste material from the tank; a first auger, positioned within the tank, adapted to convey the waste material from the tank, and wherein the first end of the handling member is pivotly attached to the reciprocating carriage.

Next, the process includes transporting the carriage from a first position to a second position, and the drilling fluid waste is pumped from the tank. The operator will terminate the pumping and allow the waste to separate into a solid phase and a liquid phase. Thereafter, the operator will transport the carriage from a first location of the tank to a second location of the tank so that the solids phase is pushed to the second side of the tank, and thereafter, removing the solid phase from the tank with the first auger.

The system may further comprise pivoting means adapted to pivot the elongated member from a first position to a second position, and thus, the process further comprises pivoting the elongated member from the first position to the second position so that the drilling fluid waste is stirred.

It should be noted that the process may include channeling the waste to a process device, and thereafter, conveying the waste to the pump means via the process device. Next, the operator would transport the carriage from a first side of the tank to a second side of the tank so that the solid phase is pushed to the second side of the tank. The solid phase can then be removed from the tank with the first auger.

The pump means may include an impeller assembly operatively attached thereto, and with this embodiment, the process further comprises rotating the impeller which in turn channels the waste with the rotating impeller so that the pump is loaded.

An advantage of the present system is that the operator may remove tons of environmental waste from a site without spillage to the surrounding area. Another advantage is that the invention combines the concept of a backhoe, pump, dozer, and auger into a complete operable system.

Yet another advantage is that the present invention saves an operator time since in the past it was required to separately utilize the referenced components in order to adequately and safely handle the waste. Still yet another advantage is that the system herein disclosed will produce the operator significant savings.

An advantage of the second embodiment of the present invention includes use of a vertical auger that causes the slurry to be channeled downward. Another advantage is the vertical auger will shred, dissipate and disperse the solids into smaller particles that have better flow properties and/or may be suspended in the fluid phase. Yet another advantage is that the impeller will serve to agitate solids and/or suspend solids in the fluid phase.

Still yet another advantage is the impeller will effect a positive displacement to the pump by channeling and loading the waste into the pump inlet. In other words, the system will also have the advantage of force feeding the slurry into the pump via the impeller. Yet another advantage is the slurry gate cooperating with the vertical auger and pump impeller to accept the channeled slurry into the pump inlet.

A feature of the present invention includes use of a mobile trolley mounted on a rail system contained on the container with a motor means. Another feature includes a handling system operatively associated with the trolley. Another feature includes a handling system containing a shovel, backhoe, pump, and pivoting means mounted thereon.

Yet another feature includes an auger to remove accumulated solids within container. Still yet another feature includes a shovel that may function as wiper, stirrer, or spade. Another feature includes use of a pump that may be varied in position to accommodate the varying levels of waste, as well as the composition of the waste, within the container. Another feature includes operation of the handling system and trolley from a remote location.

A feature of the second embodiment includes use of a detachable process device such as a vertical auger. Another feature includes having a plurality of teeth placed on the vertical auger blades. Yet another feature includes use of a slurry gate that may be manually opened or closed. The rotatable blades of the impeller is yet another example of a feature of the present invention.

DESCRIPTION OF THE PREFERRED EMBODIMENTS

Figure 1:
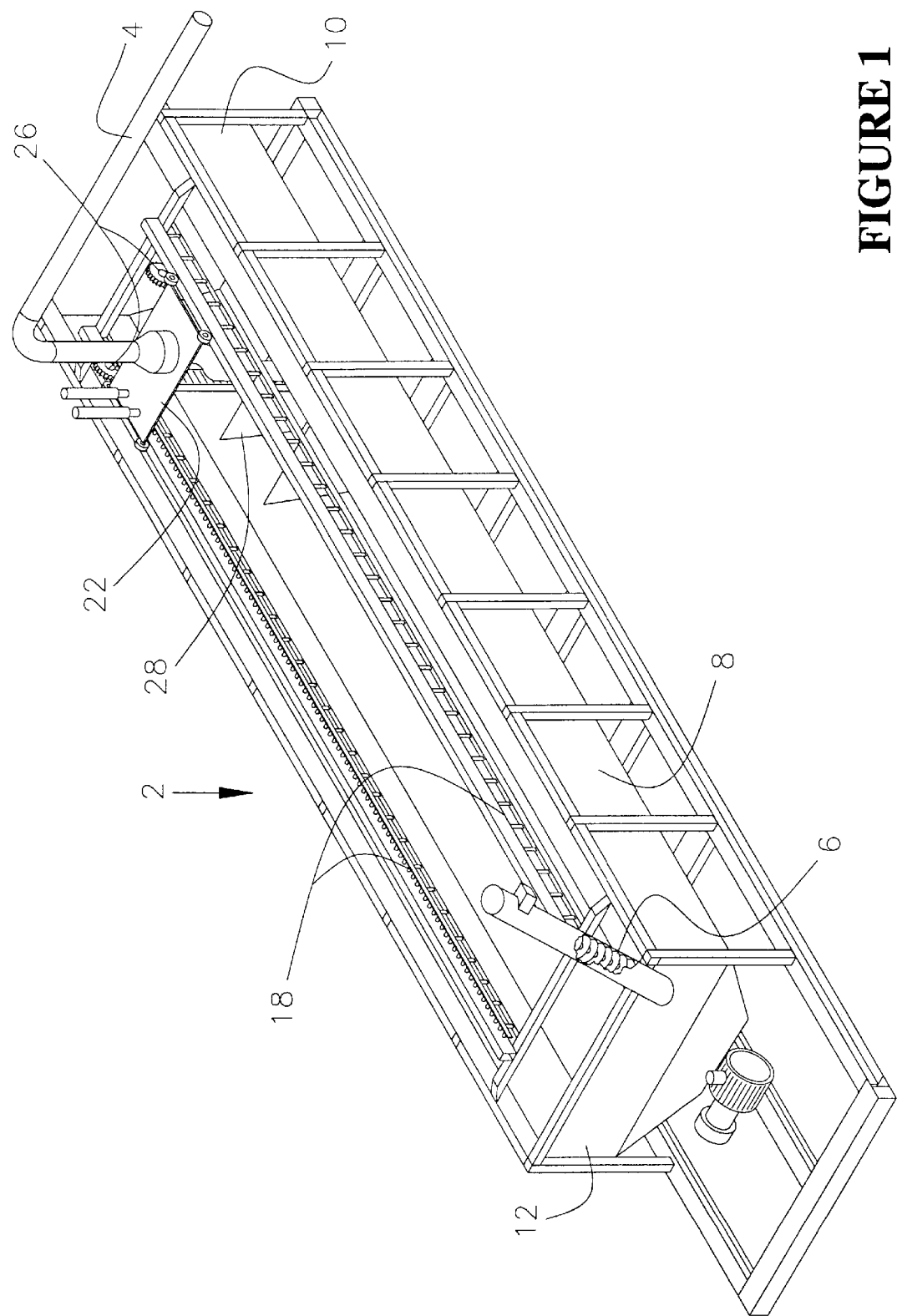
FIG. 1 is an illustration of the first embodiment of the apparatus including the container, trolley and handling system, with the handling system being in a first position.

Referring now to FIG. 1, an illustration of the apparatus 2, including the handling system 4 and auger 6, will now be described. Generally, the apparatus 2 includes a container 8 that in the preferred embodiment is an elongated tank member capable of holding the waste. The container 8 contains a first end 10 and a second end 12, with a bottom 14 and an open top end 16. As depicted in FIG. 1, the width of bottom 14 is generally narrower than the open top end 16 so that the movement of the waste within the container 8 may be facilitated, as will be more fully set out later in the application.

The container 8 is designed so that it can be easily transported from located to location. Thus, the container 8, along with the handling system 4 and auger 6 may be used on land locations, or alternatively, may be transported and placed on offshore platform or other remote locations.

The container 8 has contained thereon a pair of rails 18 that are mounted onto the container 8 by means of support braces 20. As shown in FIG. 1, the rails 18 transverse the open top end 16. It should be noted that while a pair of rails 18 has been depicted, a single rail member is within the scope of this invention.

The pair of rails 18 will have operatively associated therewith the handling system 4. The handling system 4 is mounted on a platform 22, with the platform having a set of wheels 24. The platform 22 may also be referred to as the trolley 22. The platform 22 will also contain a pair of sprocket wheels 26 which are propelled by a motor means, which will be described later in the application, so that the handling system is moved back and forth from the first end 10 to the second end 12 as desired by the operator. The sprocket wheel 26 projections fit within and engaged with the tracks 80 for traction.

The handling system 4 will have extending into the container 8 a shovel means 28, operatively associated with the platform 22, for transporting the waste from one end 10 to the other end 12 of the container. Alternatively, the shovel means 18 may be used to stir the waste contained within the container 8. The handling system 4 will also have associated therewith a pump means 30, operatively associated with the shovel means 28, for pumping the waste from the container 8. It should be noted that throughout the application, like numbers in the various figures refer to like components.

Figure 2:
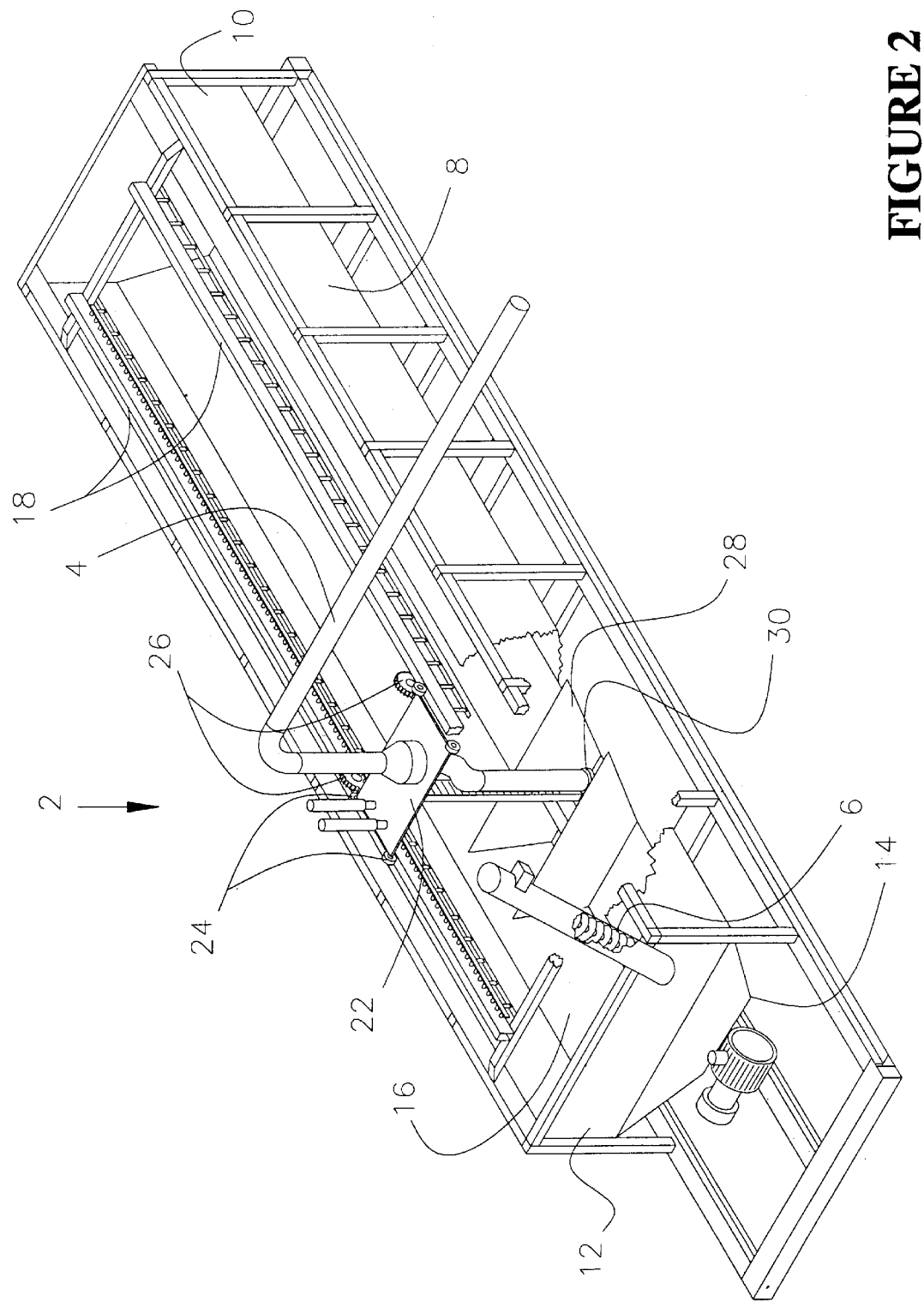
FIG. 2 depicts the apparatus of FIG. 1 with the handling system in a second position.

Referring now to FIG. 2, the apparatus 2 of FIG. 1 is illustrated wherein the trolley 22 and handling system 4 has been moved to a second position. The transporting of the handling system 4 is controlled by activating the motor so that the sprocket wheels 26 revolve so that the trolley 22 (via the wheels 24) is moved. The shovel means 28 will also travel within the container 8. The shovel means 28 is held in a rigid position, perpendicular to the bottom 14. Thus, the waste within the container is pushed to the end 12. At this point, the auger 6 may be activated in order to transport the waste from the container 8.

Figure 3:
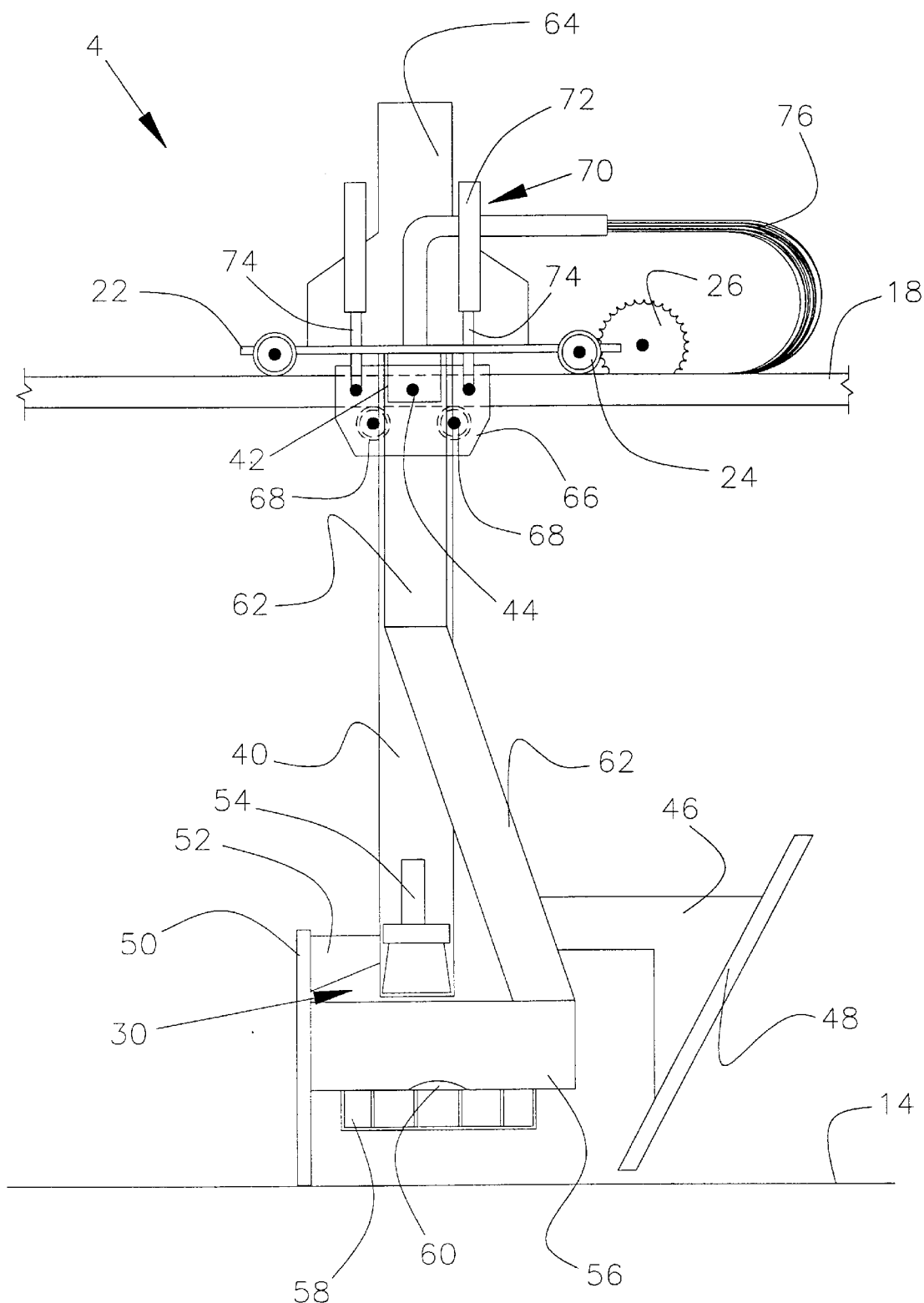
FIG. 3 is a schematic side view illustration of an embodiment of the handling system of the first embodiment.

As seen in FIG. 3, an expanded view of the handling system 4 will now be described. As illustrated, the trolley 22 has attached thereto the wheels 24 which are positioned on the track 18. Also associated with the trolley 22 is the sprocket wheels 28 which are driven by a motor means 38 for propelling the sprocket wheels 28.

The shovel means 28 will have associated therewith a boom ladder member 40, with the boom ladder member 40 extending from an extension member 42. The boom member 40 and the extension member 42 are pivotally attached by conventional means such as by pin 44. The extension member 42 is attached to the platform 22.

The boom ladder member 40 will have attached thereto an extension member 46, with the extension member in turn having a shovel blade 48. As depicted in FIG. 3, the shovel blade 48 is tilted at an angle relative to the bottom 14 of container 8. Also depicted in FIG. 3 is a detachable shovel blade 50 which in turn is attached to the boom member 40 via the extension member 52, with the detachable shovel blade 50 facing in an opposite plane with respect to the shovel blade 48. Thus, in operation as the handling system 4 is moved from a first position to a second position and then back to the first position, the shovel blade 50 can act to shovel the waste in a second direction. In an alternative embodiment, the detachable shovel blade 48 need not be connected.

The handling system 4 has included therewith a pump means 30 which includes the pump motor 54 which in turn is adapted to the pump cylinder 56. A guard 58 is also included so that the suction inlet 60 is raised enough off the bottom so that large solids do not enter the pump or block off the suction inlet 60. A disposal conduit 62 leads from the pump cylinder 56 so that the siphoned waste will lead to the swivel joint conduit 64 for ultimate disposal.

Also included will be a plate 66 aiding in the attachment of the boom ladder member to the handling system 4, and associated therewith will be bottom rollers 68 which aids in keeping the platform 22 on the track 18. The handling system 4 will also include the oscillating means 70 for oscillating and pivoting the boom ladder 40. Generally, the oscillating means 70 contains a pair of hydraulic cylinders 72 that have a cooperating pair of hydraulic cylinder rams 74. The oscillating means 70 will be operatively connected to a hydraulic line system 76, with the line system 76 being long enough so that as the handling system travels along the rail 18, the line system 76 will extend the proper distance. Also, back and forth movement of the trolley 22 along the rail 18 is possible.

Figure 4:
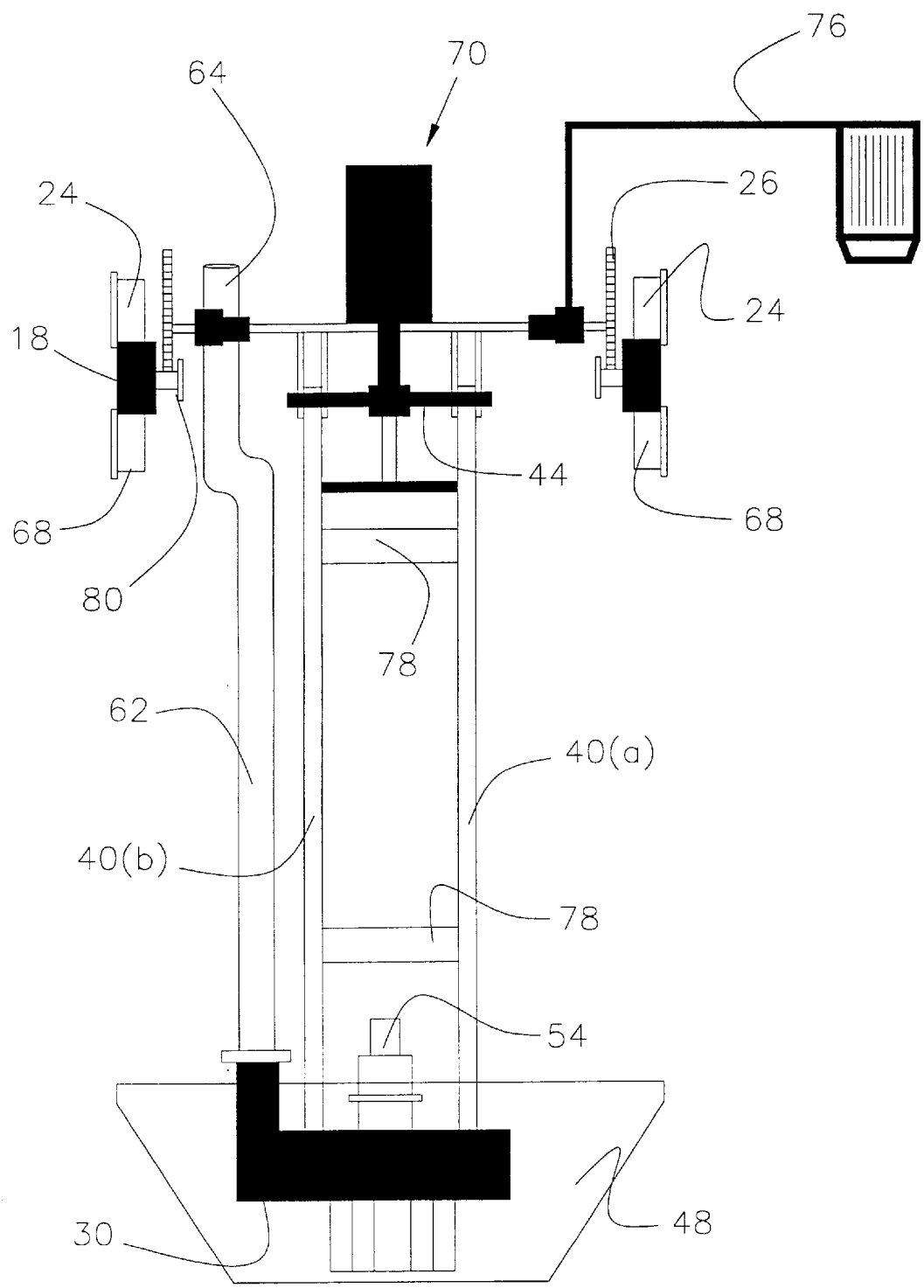
FIG. 4 is a schematic front view illustration of the handling system of FIG. 3.

Referring now to FIG. 4, a front elevation of the handling system 4 is shown. In the preferred embodiment, the boom member 40 has a first leg 40a and a second leg 40b, with the support braces 78 also being included. Also depicted in FIG. 4 is the cooperation of the wheels 24 and the bottom rollers 68 with the rail 18. Additionally, the oscillating means 70 is depicted with the swing cylinders 72 that lead to the hydraulic cylinder rams 74.

FIG. 4 also depicts the means by which the handling system 4 travels along the rail and track 80. More particularly, the sprocket wheels 26 are adapted for engagement with the track 80, with the track 80 being capable of receiving the sprocket projections.

Figure 5:
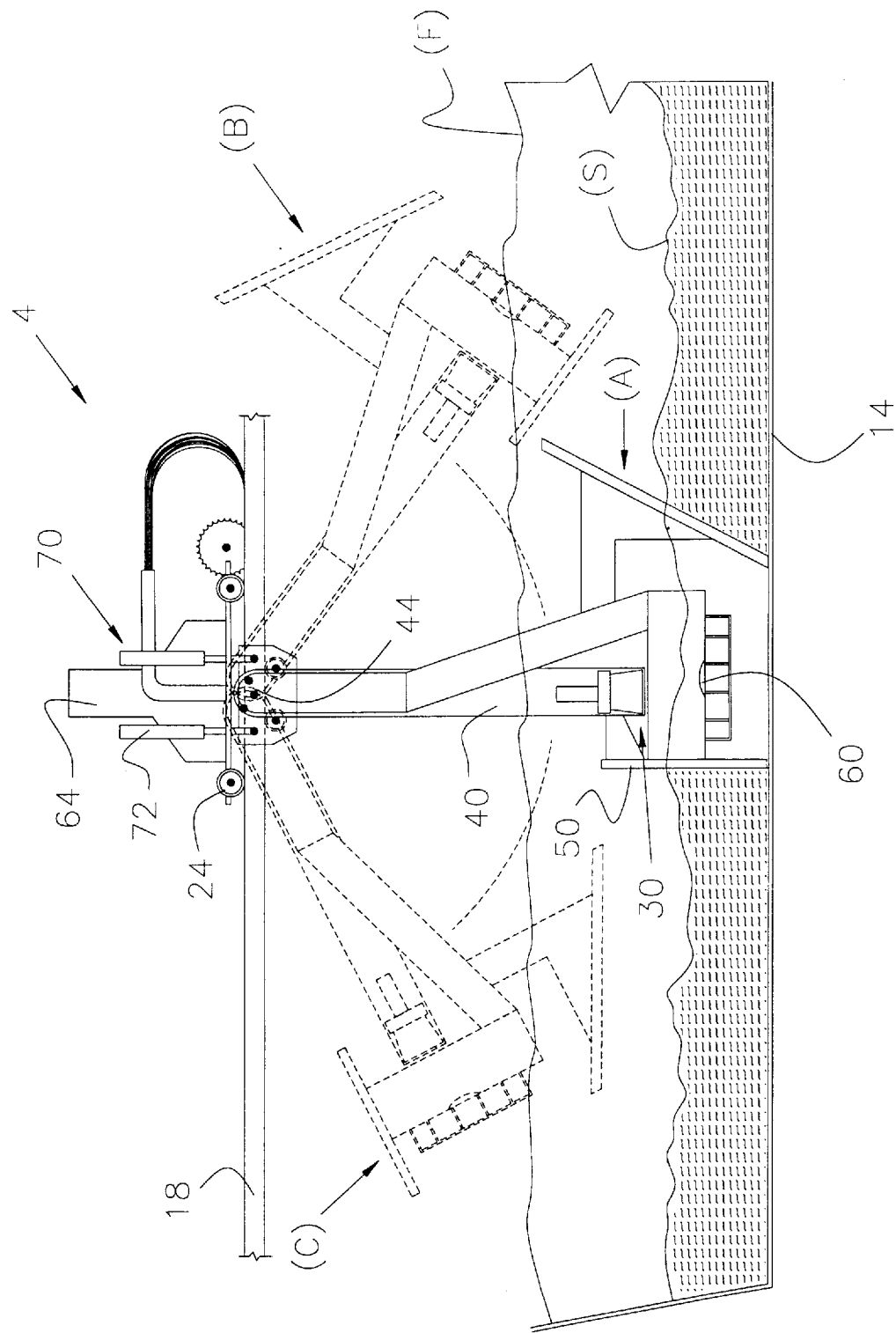
FIG. 5 depicts the schematic side view illustration of the handling system of FIG. 3 in various positions within the container.

Referring now to FIG. 5, the operation of the invention will now be discussed. As shown, the handling system 4 has the boom ladder 40 extended perpendicular relative to the bottom 14 in the position designated by the letter (A). In the illustration of FIG. 5, the container 8 has a waste disposed therein. More particularly, the waste has two different phases, namely: (1) a mostly liquid phase with solids disposed therein; and, (2) a mostly solid phase with a liquid disposed therein.

Thus, with the boom 40 in the position as representative by (A), the operator may activate the motor means so that the sprocket wheels 26 rotate which in turn moves the trolley 22 and handling system 4 forward on the rails 18. As the handling system moves forward, the shovel blade 48 will heap the waste in the direction of the auger 6 for removal by the auger 6. Alternatively, the operator may reverse the direction of the handling system 4 so that the detachable shovel blade 50 will heap the waste in the opposite direction of travel. The operator may also kick on the pump means 30 to suction off accumulated liquid during this process. This can continue at the discretion of the operator until the container 8 is properly emptied.

As an alternate means of operation, the operator may pivot the boom ladder member 40 as shown in the position (B) of FIG. 5. This is accomplished by activating the hydraulic cylinders so that the hydraulic rams pivot the boom ladder member 40. If desired, the position (B) corresponds with a level that places the suction point 60 within the fluid (F) phase.

At the position shown in (B), the pump means 30 may be activated which in turn will suction the fluid (F) phase into the disposal conduit 62. Of course, if so desired by the operator, the sprocket wheel 26 may be activated which in turn would cause the handling system 4 to travel via the rails 18. Thus, the waste would also be stirred by such action. An oscillating movement of the boom 40 may aid in stirring the waste, or alternatively, dislodge unwanted piles of solids that have built up within the container 8.

As yet another alternate means of operation, the operator may pivot the boom ladder member 40 as shown in the position (C) of FIG. 5. This is accomplished by activating the hydraulic cylinders so that the hydraulic rams pivot the boom ladder member 40 backward relative to position (B). Again, the position (C) may correspond with a level that places the suction point within the fluid (F) phase.

Therefore, the operator may activate the pump means 30—at the position shown at (C)—which in turn will suction the fluid (F) phase into the disposal conduit 62. The handling system 4 may again be moved via the sprocket wheel 26. An oscillating movement of the boom 40 may aid in stirring the waste, or alternatively, dislodge unwanted piles of solids that have built up within the container 8. The movement of the boom 40, handling system 4 and activation of the pump means 30 is done by the operator depending on the particular characteristics of the waste.

The boom 40, handling system 4, auger 6 and activation of the pump means 30 may be controlled remotely from a site away from the container, or alternatively, the control system for the operator may be placed on the container.

Figure 6:
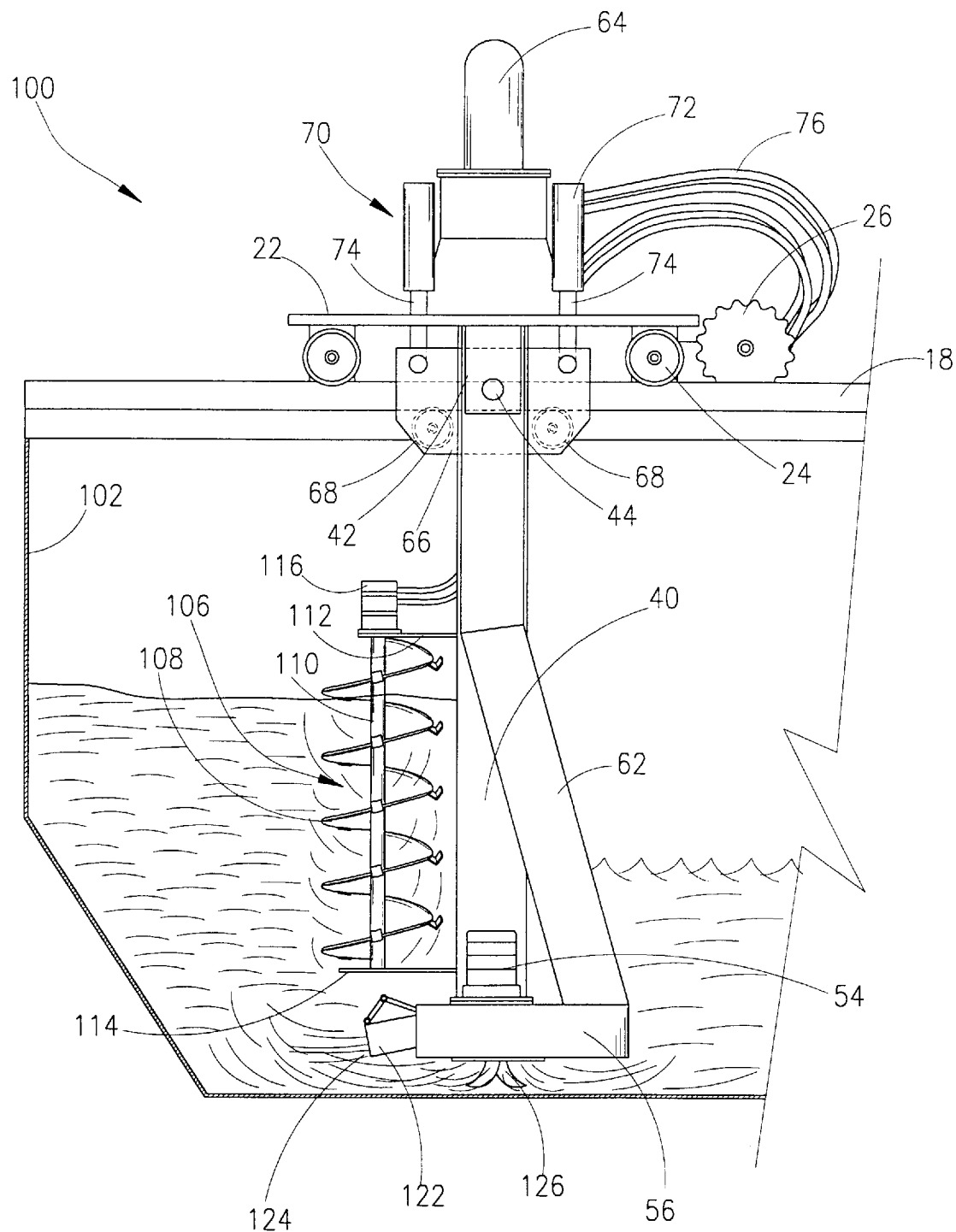
FIG. 6 is an illustration of the second embodiment of the apparatus including the container, trolley and handling system, with the handling system being in a first position.

Referring now to FIG. 6, an illustration of the second embodiment (which is the preferred embodiment of this application) of the apparatus 2 including the container 8, trolley 22 and handling system 4, with the handling system 4 being in a first position, will now be described. It should be noted that like numbers appearing in the various figures refer to like components. Generally, the apparatus 2 is similar in construction to the first embodiment.

Thus, platform 22 is operatively associated with the rails 18 situated with the container 8. As previously described, extending therefrom is the disposal conduit 62 that is operatively associated with the pump means including the pump motor 54 and pump cylinder 56. With the preferred apparatus 2, a process device 106, which in the preferred embodiment is an auger, has been selectively attached to the boom ladder member 40. Thus, the second auger 106 will comprise a generally spiral blade 108 coiled about a centered mandrel 110. The second auger 106 is rotatably attached via the supports 112 and 114, with the supports being detachably affixed to the boom ladder member 40. A hydraulic member 116 is operatively associated with the detachable second auger 106 so as to power the detachable auger 106 to rotate.

The detachable second auger 106 will process the slurry by blending, mixing, and dispersing the solids into the fluid phase so that the slurry is more manageable since the slurry is more consistent. Also, the flow properties of the slurry are significantly increased. The second auger 106 will also act as a shovel and/or wiper since it tends to collect the waste so that the waste may be handled. The auger spiral blades 108 will also contain upstanding projections or teeth 120 that will aid in the ripping apart of the solids. As shown in FIG. 6, the auger 106 will funnel the slurry downward towards the pump cylinder 56.

Also included with the present invention is the slurry gate 122 which is a valve means that has an open position and a closed position. In the embodiment shown in FIG. 6, the slurry gate 112 is a manually opened or closed gate. When the gate 122 is opened, the inlet 124 will receive the slurry and transport the slurry into the pump cylinder. Alternatively, the operator may wish to have the slurry gate closed wherein the slurry would be received in pump inlet 126. The slurry gate 122 is configured to receive the slurry being discharged from the auger 106 as well as receiving the slurry from the bottom area of the container 8 as shown by the flow lines in FIG. 6. The operator may deem it appropriate to close the slurry gate, when for instance, the detachable auger 106 has been detached and/or the detachable auger 106 is not in use. The slurry gate 122 will have extendable arms 124 for closing and opening the gate 122.

Also shown in FIG. 6 is the impeller member 126 that are configured at the bottom of the pump cylinder 56. The impeller member comprise a plurality of blades 128, 130, 132 that are rotatably mounted on the pump means. The impeller blades 128, 130, and 132 are vertically oriented blades that extend from a horizontal base plate 134, with the horizontal base plate 134 being operatively configured with the pump inlet, with the pump inlet being configured on the bottom of the pump cylinder 56. The horizontal base plate 134 contains the opening 136 which is operatively configured to be connected to the pump inlet.

Figure 7:
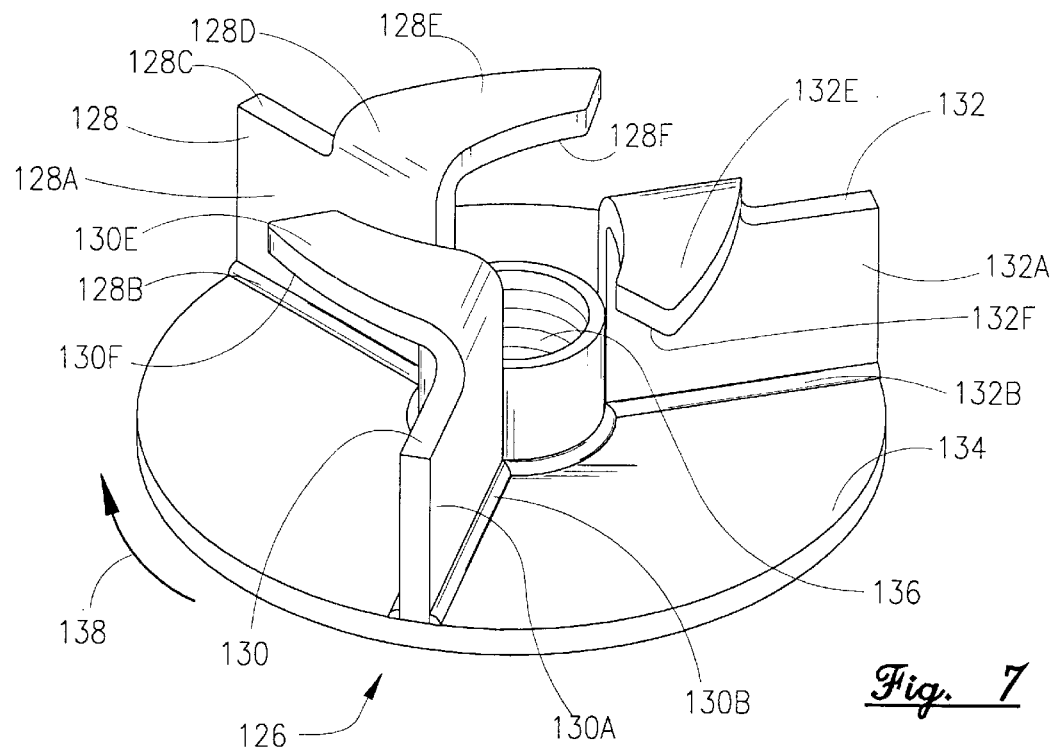
FIG. 7 is a perspective view of the impeller device.

Each of the blades 128, 130, 132 will be of similar construction. Thus, for instance, blade 128 will have a substantially flat plate 128A, with the plate 128A having a first end 128B that is attached to the horizonal base plate 134 by conventional means, such as welding. The plate 128A will extend to the second end 128C, with the end 128C containing the curved tail area 128D. The tail area 128D extends from the side radially adjacent the opening 136. As seen in FIG. 7, the tail area has a surface 128E and a surface 128F with the surfaces 128E being convex and surface 128F being concave (in the preferred embodiment) such that a pocket or scoop is formed thereon. The blade 130 will have a substantially flat plate 130A, with the plate 130A having a first end 130B that is attached to the horizontal base plate 134. The plate 130A will extend to the second end 130C, with the end 130C containing the curved tail area 130D. The tail area 130D extends from the side radially adjacent the opening 136. The tail area has a surface 130E and a surface 130F with the surfaces 130E being convex and surface 130F being concave (in the preferred embodiment) such that a pocket or scoop is formed thereon. Also blade 132 will have a substantially flat plate 132A, with the plate 132A having a first end 132B that is attached to the horizontal base plate 134. The plate 132A will extend to the second end 132C, with the end 132C containing the curved tail area 132D. The tail area 132D extends from the side radially adjacent the opening 136. The tail area has a surface 132E and a surface 132F with the surface 132E being convex and surface 132F being concave (in the preferred embodiment) such that a pocket or scoop is formed thereon.

Figure 8:
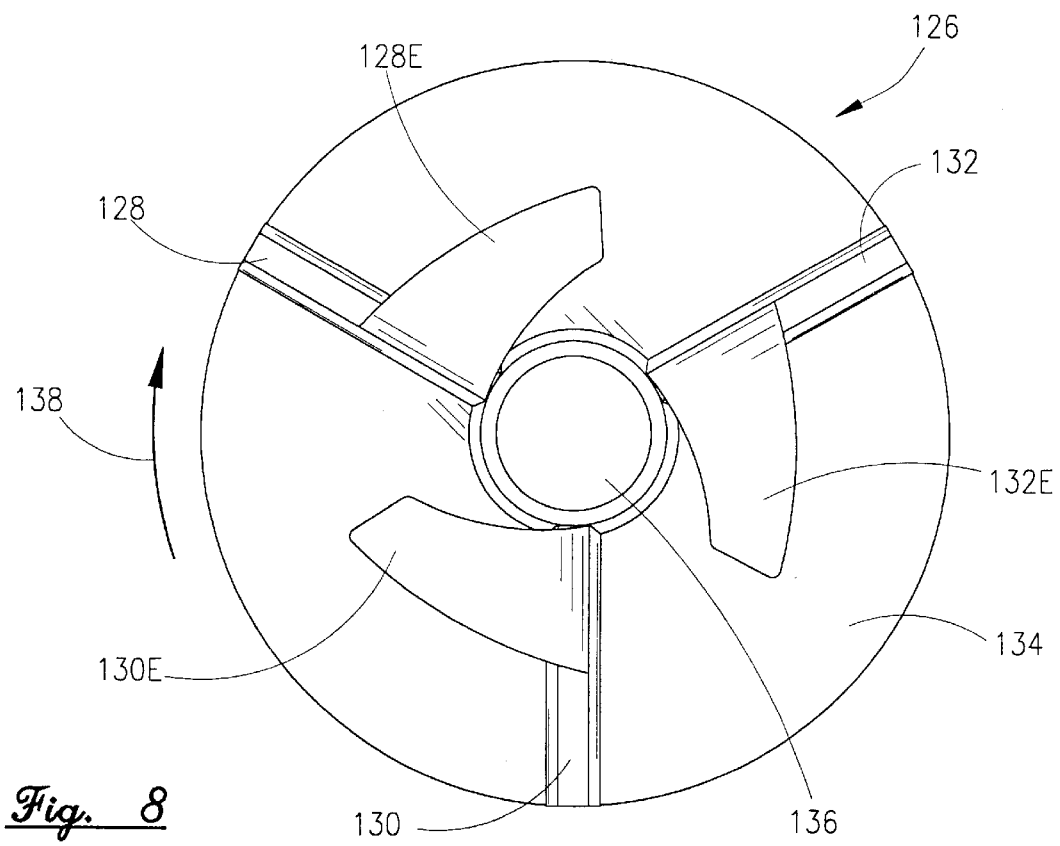
FIG. 8 is a top view of the impeller device of FIG. 7.

As can be seen by the arrow 138 which depicts the rotation of the impeller, the rotation is such that the concave surface 128F in combination with the plate surface 128A will act to funnel the waste into the opening 136. The action of concave surfaces 128F, 130F, and 132F will create a positive displacement of the waste into the pump. The centrifugal action of the blades 128, 130 and 132 forces the waste into the opening 136 which significantly aids in the efficiency of the pump means and the evacuation of the waste from the container. In other words, the rotation of the blades 128, 130 and 132 aids in the creation of energy necessary to funnel the waste into the pump inlet. Also, when the blades 126 are energized, the rotation will agitate and blend the slurry to a preferred consistency that will better enable the slurry to be pumped into the pump cylinder 56. FIG. 8 has also been included to depict the top view of the impeller member 126.

Figure 9:
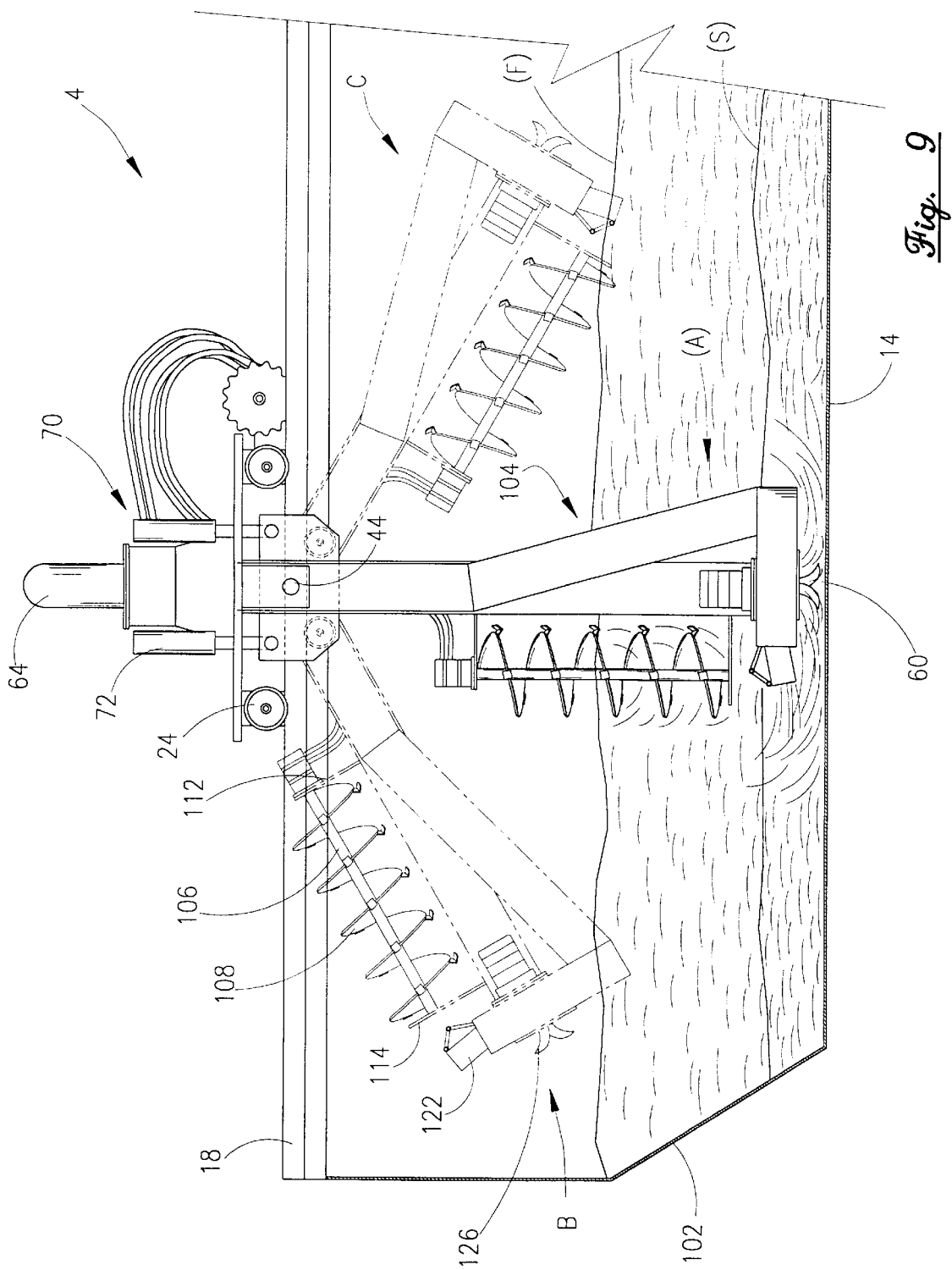
FIG. 9 depicts the schematic side view illustration of the handling system of FIG. 6 in various positions within the container.

Referring now to FIG. 9, the operation of the invention depicted in FIG. 6 will now be discussed. As shown, the handling system 4 has the boom ladder 40 extended perpendicular relative to the bottom 14 in the position designated by the letter (A). In the illustration of FIG. 7, the container 8 has a waste disposed therein. More particularly, the waste has two different phases, namely: (1) a mostly liquid phase with solids disposed therein; and, (2) a mostly solid phase with a liquid disposed therein.

Thus, with the boom 40 in the position as representative by (A), the operator may activate the motor means so that the sprocket wheels 26 rotate which in turn moves the trolley 22 and handling system 4 forward on the rails 18. As the handling system moves forward, the auger 106 will also be rotating. Therefore, the auger 106 will funnel the waste in the direction of the slurry gate 122 for channeling into the pump cylinder 56 to suction off the slurry via pump means 30. The operator may reverse the direction of the handling system 4 so that the handling system 4 travels in an opposite direction thereby traversing the container bottom 14. This can continue at the discretion of the operator until the container 8 is properly emptied.

As an alternate means of operation, the operator may pivot the boom ladder member 40 as shown in the position (B) of FIG. 7. This is accomplished by activating the hydraulic cylinders so that the hydraulic rams pivot the boom ladder member 40. If desired, the position (B) corresponds with a level that places the suction point 60 within the fluid (F) phase.

At the position shown in (B), the pump means 30 may be activated which in turn will suction the fluid (F) phase into the disposal conduit 62. The auger 106 may be activated so that slurry may be funneled through the blades 108. Even though the inlet 124 may be in the fluid phase, since the slurry will still contain some solids, the action through the auger 106 will only aid in the blending of the slurry for a better slurry consistency for pumping and discharge. As with the operation of the first embodiment (as seen in FIG. 5), the sprocket wheel 26 may be activated which in turn would cause the handling system 4 to travel via the rails 18. Thus, the waste would also be stirred by such action. An oscillating movement of the boom 40 may aid in stirring the waste, or alternatively, dislodge unwanted piles of solids that have built up within the container 8.

As yet another alternate means of operation, the operator may pivot the boom ladder member 40 as shown in the position (C) of FIG. 9. This is accomplished by activating the hydraulic cylinders so that the hydraulic rams pivot the boom ladder member 40 backward relative to position (B). Again, the position (C) may correspond with a level that places the suction point within the fluid (F) phase.

Therefore, the operator may activate the pump means 30—at the position shown at (C)—which in turn will suction the fluid (F) phase into the disposal conduit 62. The handling system 4 may again be moved via the sprocket wheel 26. An oscillating movement of the boom 40 may aid in stirring the waste, or alternatively, dislodge unwanted piles of solids that have built up within the container 8. The movement of the boom 40, handling system 4 and activation of the pump means 30 is done by the operator depending on the particular characteristics of the waste.

The boom 40, handling system 4, auger 6 and activation of the pump means 30 may be controlled remotely from a site away from the container, or alternatively, the control system for the operator may be placed on the container.

Changes and modifications in the specifically described embodiments can be carried out without departing from the scope of the invention which is intended to be limited only by the scope of the appended claims.

I claim:

1. A system for handling a waste material comprising:

a tank containing the waste material from an oil and gas well bore;

a reciprocating carriage operatively associated with said tank, said reciprocating carriage having a handling member adapted thereto, wherein said handling member has a first end and a second end, and wherein said first end is pivotly attached to said reciprocating carriage, and said second end has disposed therewith a process device for blending, mixing, and dispersing the solids into the fluid phase, said handling member further including a pump means, operatively associated with said handling member, for receiving the waste material from said process device and pumping the waste material from said tank and wherein said pump means contains a series of rotor blades positioned for loading said pump means, said rotor blades comprising a vertically oriented plate member, with the plate member having a concave surface forming a scoop thereon; and a motor operatively associated with said handling member so that said handling member may be pivoted within said tank.

2. The system of claim 1 wherein said process device is vertically oriented with said handling member, and wherein said system further comprises:

a slurry gate operatively associated with said pump means, and adapted to receive the waste material discharged from said process device.

3. The system of claim 1 wherein said process device contains a plurality of projections extending from said process device.

4. The system of claim 3 wherein said process device is detachable from said handling member.

5. A process for handling drilling fluid waste material from an oil and gas well bore comprising:

placing the drilling fluid waste material within an apparatus for handling the drilling fluid waste material, the apparatus comprising a tank containing a solid phase and a fluid phase of the drilling fluid waste material; a reciprocating carriage operatively associated with said tank, said reciprocating carriage having a handling member adapted thereto, with a pump means, operatively associated with said handling member, for pumping the drilling fluid waste material from said tank; and wherein said first end is pivotly attached to said reciprocating carriage, and said second end has disposed therewith a process device orientated in a first plane;

transporting the carriage from a first position to a second position;

rotating said process device;

channeling the drilling fluid waste material downward through said process device;

blending the solid phase into the fluid phase;

conveying the drilling fluid waste material downward to said pump means via said process device;

pumping the drilling fluid waste material from the tank;

terminating the pumping;

allowing the drilling fluid waste material to separate into the solid phase and the liquid phase;

transporting the carriage from the second position to a third position so that the solid phase is pushed to the third position;

removing the solid phase from the tank with said pump means.

6. The process of claim 5 wherein said container further comprises a means for pivoting said handling member from a first locate to a second location, and wherein the process further comprises:

pivoting said handling member from the first location to the second location;

stirring the drilling fluid waste material.

7. The process of claim 6 further comprising:

transporting said carriage from a first side of said tank to a second side of said tank so that the solid phase is pushed to the second side of said tank;

removing the solid phase from the tank with said pump means.

8. The process of claim 5 wherein said pump means further comprises an impeller assembly operatively attached thereto, and the process further comprises:

rotating said impeller assembly, said impeller assembly containing a plurality of blades, said blades having a concave surface operatively adapted thereto so that a series of scoop is formed on said blades, and wherein said series of scoops are radially adjacent an opening of said pump means;

loading the drilling fluid waste material into said pump means via said rotating series of blades.

9. An apparatus for handling waste material from an oil and gas well bore, the apparatus comprising:

a vessel containing the waste material, the waste material including a solid phase and a liquid phase, said vessel containing a rail member;

a trolley operatively associated with said rail, said trolley having a handling member associated therewith;

motor means, adapted with said trolley, for moving said trolley on said rail member;

a pump means, adapted with said trolley, for pumping the waste material from the container;

reciprocating means, operatively attached to said trolley, for pivoting said handling member within said vessel;

an impeller assembly operatively associated with said pump assembly, said impeller assembly adapted to feed the waste material into said pump means.

10. The apparatus of claim 9 wherein said impeller assembly comprises: a base plate having an opening; a plurality of blades including a first section attached vertically from said base plate and a second curved tail section extending from said first section, with the second curved tail section extending from a side radially adjacent said opening; and wherein said opening is aligned with an inlet to said pump means.

11. The apparatus of claim 10 further comprising a process device attached to said handling member and wherein said process device member contains a spiral blade, and a series of projections formed on said spiral blades.

12. The apparatus of claim 11 wherein said process device member is a detachably associated with said handling member.

* * * * *